Dec. 17, 1929.  M. GARBELL  1,739,896
WINDSHIELD CLEANER
Filed Nov. 5, 1928
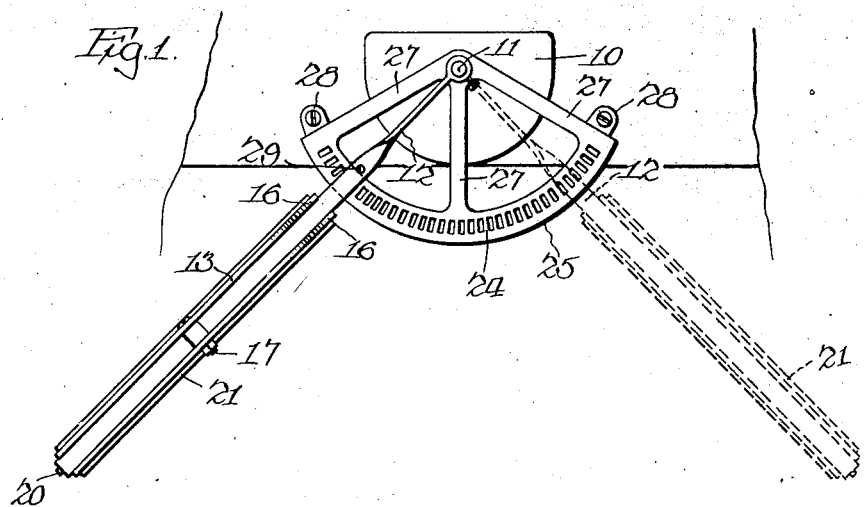
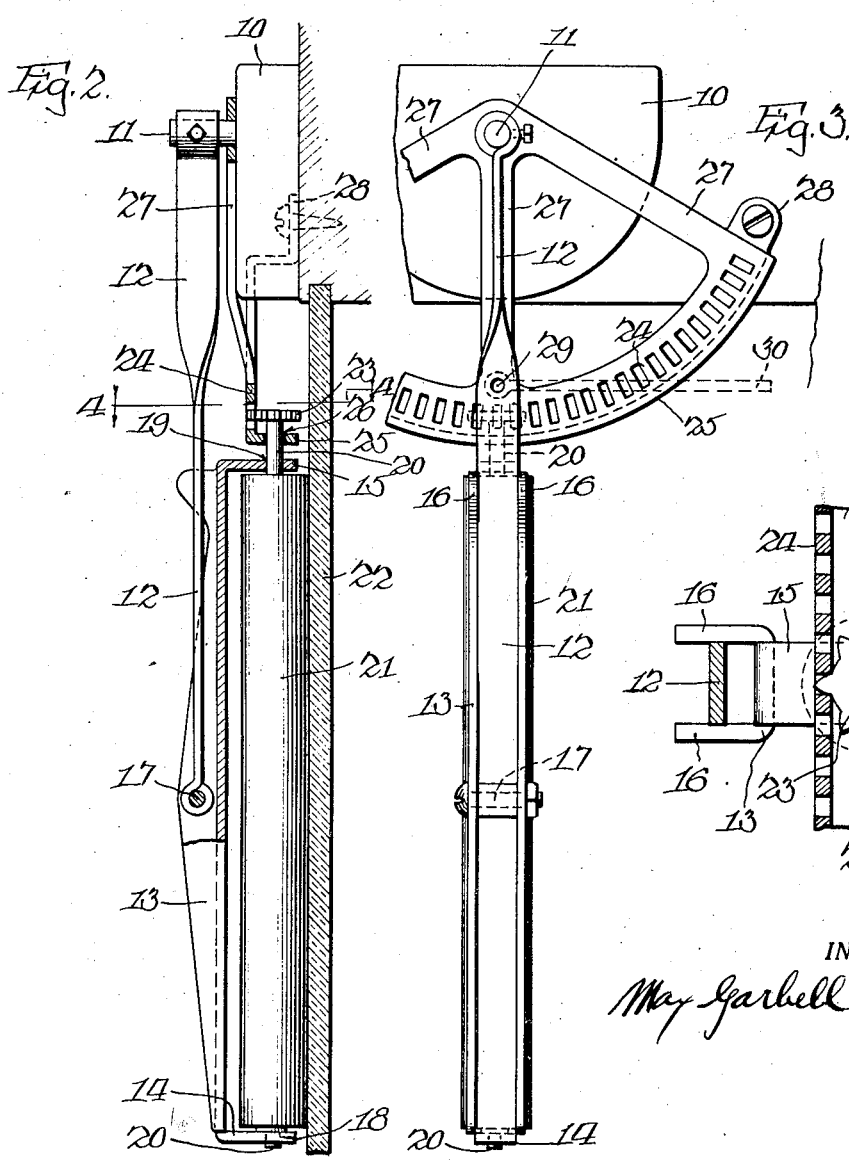
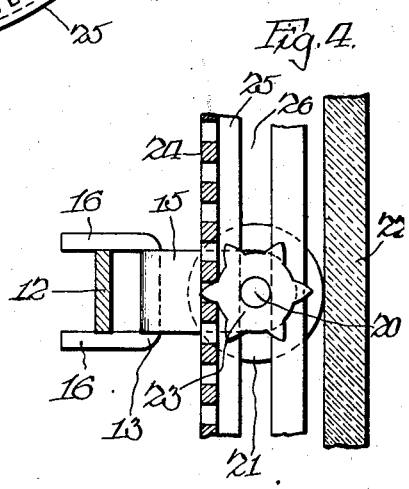
INVENTOR.
May Garbell Patented Dec. 17, 1929

1,739,896

UNITED STATES PATENT OFFICE

MAX GARBELL, OF CHICAGO, ILLINOIS

WINDSHIELD CLEANER

Application filed November 5, 1928. Serial No. 317,252.

The invention relates to improvements in the oscillating or swinging type of windshield cleaners in which a rotatable wiper element is mounted to swing across the windshield and in contact with the glass thereof, whereby the glass can be kept clear of accumulations of water, snow and ice, enabling the driver to obtain a clear vision of the road ahead. Further objects of the invention are the novel features of construction, whereby the wiping element is caused to rotate on its axis, and the side thereof adjacent the glass, moves forward by axial motion while the wiper is being moved bodily forward.

A further object of the invention is to provide a simple and effective means whereby the rotatable wiper element may be readily and easily attached to any standard type of oscillating or swinging windshield cleaners.

A still further object of the invention is to provide carrying means and means to rotate the wiper element and hold same in constant resilient contact with the glass, in either swinging direction.

These features are accomplished by means of the device disclosed in the drawings forming a part of the present specification; like characters of reference designate similar parts throughout the said specification and drawings, and in which:

Fig. 1 is a front elevation showing the device in position;

Fig. 2 is a medial section of the device;

Fig. 3 is an enlarged face view of the device;

Fig. 4 is a section on the line 4—4 of Fig. 2;

Referring to the drawings, 10 designates the motor of any standard type of swinging windshield cleaner, having a shaft 11 extending therefrom, to which a resilient arm 12 is secured, and pivoted to the lower end of the arm 12 is a channel-shaped yoke member 13, which is provided with an inwardly turned ear 14 at its lower end, and an inward turned ear 15, at its upper end. A pair of extending ears or guiding means 16 straddle the arm 12 and provide a free pivotal movement of the channel yoke member 13, and to assist in guiding said member 13 against cross-wise movement of the pivot 17.

The lower ear 14, and the upper ear 15 are provided with openings 18 and 19 respectively to receive the ends of a shaft 20 which has secured thereto the cylindrical wiping element 21 and which is held in yielding contact with the glass 22 of the windshield by means of the resilient arm 12, and in longitudinal contact by means of the pivot 17.

Fixed to the upper end of the shaft 20 is a pinion 23 which is in mesh with a segmental rack or gear 24. The rack 24 is provided with an inwardly-turned flange 25 which has an elongated slot 26 through which the upper end of the shaft 20 is guided, to insure constant and positive mesh of the pinion 23.

The segmental rack 24 is provided with integral arms 27 terminating at the pivot center of the motor shaft 11, and is also provided with ears 28 for securing the rack with respect to the swinging elements.

It is often found desirable to set up windshield cleaners in pairs, and therefore the arm 12 has an opening 29 to which a crossbar 30 shown in dotted lines may be attached to operate in conjunction with another wiper not shown.

In the operation of the device the motor 10, which may be of any suitable type, rocks the shaft 11 swinging with it the arm 12, the channel yoke member 13 and the wiping element 21. Said element 21 is constantly in contact with the glass. As the pinion 23 is fixed to the wiping element 21 and meshes with the fixed segmental rack 24, it will be obvious that by rocking the motor shaft 11 will cause the rotary movement of the wiping element 21 and effect a scraping and wiping action upon the face of the windshield glass, thereby causing the wiping element to operate in a most effective manner upon any accumulation of water, snow or ice.

Having thus fully described my invention, what I claim as new and desire to secure by Letters Patent is:

1. A windshield cleaner, including a swinging member mounted on a rocking shaft, an elongated wiping element carried by said swinging member to contact the glass along a longitudinal side of the wiping element, and means for causing said wiping element to turn on its longitudinal axis whereby the side thereof adjacent to and in contact with the glass moves forward by axial motion while the wiper is being moved bodily forward.

2. A windshield cleaner, including a resilient swinging arm member mounted on a rocking shaft, means for rocking the shaft on its axis, a yoke member pivoted to said resilient swinging arm member, a wiping element carried by said yoke member, and gearing for causing said wiping element to turn on its axis, whereby the side thereof adjacent to the glass of the windshield moves forward by axial motion while the wiper is being moved bodily forward.

3. A device of the class described, comprising the combination of a wiping element mounted to swing back and forth in an arcuate path across a portion of a windshield and to remain in contact with the glass thereof when moved in either direction, and means to cause the wiping element to be turned on its axis with the side thereof in contact with the glass moving forward when the wiping element is bodily moved forward in either direction.

4. In a device of the class described, the combination of a shaft mounted for rocking movement, means for rocking the shaft on its axis, a resilient arm carried for swinging movement by said shaft, an elongated wiping element carried by said arms and so as to contact the surface to be wiped, and means for causing said wiping element to be rotated by the rocking movement of said rocking shaft in a direction which opposes frictionally the forward movement of the wiping element.

5. In a device of the class described, the combination of a shaft mounted for rocking movement, means for rocking the shaft on its axis, a resilient arm carried for swinging movement by said shaft, a yoke member pivoted to said resilient arm, a wiping element mounted on said yoke member, geared means for causing said wiping element to turn on its axis, and pivotal means for said yoke member to maintain perfect longitudinal alignment of said wiping element.

6. In a device of the class described, the combination of a shaft mounted for rocking movement, means for rocking the shaft on its axis, a resilient arm carried for swinging movement by said shaft, a yoke member pivotally mounted on said resilient arm, guiding means on said yoke member adapted to straddle said resilient arm, a wiping element pivotally mounted on said yoke member, a pinion fixed to said wiping element, a segmental rack fixedly secured concentrically with respect to said rocking shaft, an elongated slot in said rack for retaining the engagement of the pinion with the rack while the wiping element is in contact with the glass.

7. A device of the class described, comprising a motor driven rocking shaft, a resilient arm fixed thereto, a yoke member pivoted to said arm, a wiping element rotatably mounted on said yoke member, a segmental rack fixed concentric with said rocking shaft, a pinion carried by the wiping element and engaging said segmental rack, and means for retaining the engagement of the pinion with the rack while the wiping element is turning in contact with the glass.

MAX GARBELL.